(12) United States Patent
Xu et al.

(10) Patent No.: US 12,354,766 B2
(45) Date of Patent: Jul. 8, 2025

(54) LARGE-TONNAGE DISC-SHAPED SUSPENSION CERAMIC INSULATOR AND PRESTRESSING ASSEMBLING DEVICE AND METHOD FOR SAME

(71) Applicants: CHAOHU UNIVERSITY, Hefei (CN); PINGXIANG BEST INSULATOR GROUP CO., LTD, Pingxiang (CN)

(72) Inventors: Xiaoyong Xu, Hefei (CN); Jiasheng Liu, Pingxiang (CN); Hui Wei, Hefei (CN); Fenping Chen, Pingxiang (CN); Lin Xu, Pingxiang (CN); Linmin Xu, Hefei (CN); Zhiying Zhou, Pingxiang (CN); Jianguo Deng, Pingxiang (CN); Minghua Liu, Pingxiang (CN)

(73) Assignees: CHAOHU UNIVERSITY, Hefei (CN); PINGXIANG BEST INSULATOR GROUP CO., LTD, Pingxiang (CN)

( * ) Notice: Subject to any disclaimer, the term of this patent is extended or adjusted under 35 U.S.C. 154(b) by 0 days.

(21) Appl. No.: 19/017,745

(22) Filed: Jan. 12, 2025

(65) Prior Publication Data

US 2025/0149207 A1 May 8, 2025

Related U.S. Application Data

(63) Continuation of application No. PCT/CN2024/138367, filed on Dec. 11, 2024.

(30) Foreign Application Priority Data

May 15, 2024 (CN) .......................... 202410598244.8

(51) Int. Cl.
*H01B 17/02* (2006.01)
*C04B 14/30* (2006.01)
(Continued)

(52) U.S. Cl.
CPC .......... *H01B 17/02* (2013.01); *C04B 14/303* (2013.01); *C04B 16/0633* (2013.01);
(Continued)

(58) Field of Classification Search
CPC ........ H01B 17/02; H01B 19/00; H01B 17/00; H01B 17/005; H01B 17/12; H01B 17/38;
(Continued)

(56) References Cited

U.S. PATENT DOCUMENTS

| | | | | |
|---|---|---|---|---|
| 3,192,312 A | * | 6/1965 | Sauer ..................... | H01B 17/02 174/209 |
| 4,069,357 A | * | 1/1978 | Miller .................... | H01B 19/04 427/377 |

(Continued)

FOREIGN PATENT DOCUMENTS

| | | |
|---|---|---|
| CN | 108053957 A | 5/2018 |
| CN | 109081678 A | 12/2018 |
| CN | 116425479 A | 7/2023 |

*Primary Examiner* — Angel R Estrada
(74) *Attorney, Agent, or Firm* — True Shepherd LLC; Andrew C. Cheng

(57) ABSTRACT

A large-tonnage disc-shaped suspension ceramic insulator includes a ceramic insulator body, and a metal pin and a metal cap coaxially assembled with the ceramic insulator body through adhesive material, assembly interfaces of the ceramic insulator body, the metal cap, and the metal pin are coated with a primer; the adhesive material includes an expansion agent; and the expansion agent is configured to make the adhesive material expand after hardening so as to create a prestress between the ceramic insulator body and the metal pin as well as the metal cap. The present disclosure achieves overall compressive prestress distribution of the ceramic insulator product, mitigating thermal stress caused by temperature changes and improving the tensile strength of the large-tonnage disc-shaped suspension ceramic insulator assembly. By treating the assembly interfaces with the (Continued)

primer, the present disclosure significantly improves the assembly strength of the ceramic insulator/metal assembly.

8 Claims, 11 Drawing Sheets

(51) Int. Cl.

| | |
|---|---|
| *C04B 16/06* | (2006.01) |
| *C04B 18/14* | (2006.01) |
| *C04B 22/10* | (2006.01) |
| *C04B 24/08* | (2006.01) |
| *C04B 24/26* | (2006.01) |
| *C04B 28/06* | (2006.01) |
| *C04B 38/02* | (2006.01) |
| *H01B 19/00* | (2006.01) |
| *C04B 103/30* | (2006.01) |
| *C04B 103/32* | (2006.01) |
| *C04B 103/50* | (2006.01) |
| *C04B 111/00* | (2006.01) |

(52) U.S. Cl.
CPC ............ *C04B 18/146* (2013.01); *C04B 22/10* (2013.01); *C04B 24/08* (2013.01); *C04B 24/2647* (2013.01); *C04B 28/06* (2013.01); *C04B 38/02* (2013.01); *H01B 19/00* (2013.01); *C04B 2103/302* (2013.01); *C04B 2103/32* (2013.01); *C04B 2103/50* (2013.01); *C04B 2111/00663* (2013.01)

(58) Field of Classification Search
CPC ... H01B 19/04; C04B 14/303; C04B 16/0633; C04B 18/146; C04B 22/10; C04B 24/08; C04B 24/2647; C04B 28/06; C04B 38/02; C04B 2103/302; C04B 2103/32; C04B 2103/50; C04B 2111/00663
USPC ......... 174/138 C, 137 R, 138 R, 140 R, 142, 174/143, 152 R, 153 G, 174; 16/2.1, 2.2
See application file for complete search history.

(56) References Cited

U.S. PATENT DOCUMENTS

| | | | | |
|---|---|---|---|---|
| 4,267,402 | A * | 5/1981 | Reighter | B29C 67/244 174/209 |
| 4,563,544 | A * | 1/1986 | Bui | H01B 19/04 427/126.3 |
| 4,689,445 | A * | 8/1987 | Seike | H01B 17/02 174/212 |
| 4,782,198 | A * | 11/1988 | Moriya | H01B 17/02 174/189 |
| 9,196,396 | B2 * | 11/2015 | Li | H01B 9/008 |
| 2002/0060089 | A1 | 5/2002 | Irie et al. | |
| 2004/0211587 | A1 | 10/2004 | Decker | |
| 2013/0118778 | A1 | 5/2013 | Takahashi et al. | |

* cited by examiner

LARGE-TONNAGE DISC-SHAPED SUSPENSION CERAMIC INSULATOR AND PRESTRESSING ASSEMBLING DEVICE AND METHOD FOR SAME

CROSS-REFERENCE TO RELATED APPLICATIONS

This application is a continuation of International Patent Application No. PCT/CN2024/138367 with a filing date of Dec. 11, 2024, designating the United States, now pending, and further claims priority to Chinese Patent Application No. 202410598244.8 with a filing date of May 15, 2024. The content of the aforementioned applications, including any intervening amendments thereto, is incorporated herein by reference.

TECHNICAL FIELD

The present disclosure relates to the technical field of ceramic insulators, and specifically to a large-tonnage disc-shaped suspension ceramic insulator and a prestressing assembling device and method for same.

BACKGROUND

Disc-shaped suspension ceramic insulators have always been the most widely used structural components for insulation in the power industry due to their excellent electromechanical characteristics, high stability, and fouling resistance, etc. The disc-shaped suspension ceramic insulator mainly includes a ceramic body, adhesive material, a steel cap, and steel pin fittings. The ceramic body, the steel cap, and the steel pin fittings are assembled into a solid integrated structure through a series of assembly processes using the adhesive material. In high-voltage transmission lines, the disc-shaped suspension ceramic insulators support heavy and long-distance wires that may swing significantly and provide insulation from the tower and thus from the ground.

Various harsh outdoor environments (such as wind, rain, thunder, lightning, bitter cold, severe heat, and dust) require disc-shaped suspension ceramic insulators to have high reliability and stability, thereby ensuring the safe and stable operation of power systems. With the rise of the ultra-high-voltage (UHV) grid, especially the construction of the West-to-East Power Transmission Project, the North-South Electricity Transmission Project, and UHV grids crossing high-altitude areas, higher requirements have been put forward for the electromechanical performance of disc-shaped suspension ceramic insulators. Firstly, as the voltage level increases, the weight of the wire continues to increase. The use of 4-wire cables for extra-high-voltage (EHV) lines and 8-wire cables for UHV lines increases the weight of the wires exponentially. Secondly, the increase in the voltage level has raised higher requirements for the insulation performance of ceramic insulators. Usually, the insulation performance is improved by increasing the tonnage and string number of ceramic insulators, which leads to an increase in the weight of the ceramic insulators. Thirdly, harsh environments (such as strong winds and sandstorms) have placed unprecedented demands on the strength of ceramic insulators. Overall, low-tonnage disc-shaped suspension ceramic insulators have the following problems.

(1) The strength of low-tonnage disc-shaped suspension ceramic insulators is insufficient to meet the requirements for use. Large-tonnage disc-shaped suspension ceramic insulators have higher strength. However, due to the increase in the tonnage and weight of the ceramic body, the cementing strength of the integrated structure formed by the ceramic body and the metal fitting is insufficient. After running for a period of time, the steel cap and the steel pin fitting are prone to loosening and even falling off from the ceramic body, thereby causing accidents in the power line.

(2) The assembly process of the ceramic insulator as well as the steel cap and the steel pin fittings is achieved through the adhesive material. During the process of overall fixing, hardening, and curing of the ceramic body and the two metal fitting, concentricity is prone to deviation. When multiple insulators with deviations are connected in series, the destructive effects caused by such deviations are rapidly amplified due to the impact of harsh environments, thereby exacerbating the degree of damage and affecting the safe operation of the power system.

The above issues will affect product quality and reliability, and even cause serious consequences for the safe and stable operation of the UHV grid. Therefore, it is necessary to design a new assembly solution to improve the assembly strength and stability of multiple assemblies and ensure that the assembly coaxiality of multiple assemblies meets regulations. In this way, large-tonnage disc-shaped suspension ceramic insulators can stably and reliably withstand extreme environmental conditions (such as different altitudes, rapid changes in temperature, severe weather, and dust) for a long time in actual operation.

SUMMARY OF PRESENT INVENTION

An objective of the present disclosure is to provide a large-tonnage disc-shaped suspension ceramic insulator and a prestressing assembling device and method for same. The present disclosure improves the multi-assembly integrated assembly strength of large-tonnage disc-shaped suspension ceramic insulators, and enhances the coaxiality and mounting accuracy of the ceramic body, the steel cap, and the steel pin.

The present disclosure adopts the following technical solutions to achieve the above objective:

A large-tonnage disc-shaped suspension ceramic insulator includes a ceramic insulator body, and a metal pin and a metal cap coaxially assembled with the ceramic insulator body through adhesive material; the adhesive material includes an expansion agent and a toughening agent; and the expansion agent is configured to make the adhesive material expand after hardened so as to create a prestress between the ceramic insulator body and the metal pin as well as the metal cap; the toughening agent comprises: 72-82 wt % of alpha-alumina ($\alpha$-$Al_2O_3$), 15-22 wt % of yttrium-stabilized zirconia with yttrium oxide in a mole fraction of 8%, and 3-7 wt % of a flux; the flux is one or more selected from a group consisting of calcium carbonate, silicon dioxide and magnesium carbonate; and the toughening agent is prepared by firing at 1,610° C., crushing, and sieving, with a particle size of 0.30-0.35 mm.

In a further improved solution, assembly interfaces of the ceramic insulator body, the metal cap, and the metal pin to be assembled with the adhesive material are coated with a primer; the primer has a specific weight of 0.78-0.82 g/cm³, and a formula including: 18-25 wt % of asphalt and 75-82 wt % of gasoline.

In a further improved solution, the adhesive material has a formula including following components by mass: 35-50 parts of modified cement, 20-35 parts of the toughening agent, 5-8 parts of the expansion agent, 2-6 parts of silica fume, 0.5-2.0 parts of an additive, and the adhesive material is doped with 2-2.5 vt % of a reinforced fiber.

In a further improved solution, the modified cement is prepared from a mixture including 85-90 wt % of Portland cement P.II525 and 10-15 wt % of sulfoaluminate cement; the Portland cement P.II525 has a specific surface area of 330-350 $m^2 \cdot kg^{-1}$, while the sulfoaluminate cement has a specific surface area of 510-550 $m^2 \cdot kg^{-1}$; and the mixture has a particle size of D50=1.5-2.3 μm;

the expansion agent has a chemical composition of 83-86 wt % of magnesium oxide, 4-6 wt % of calcium oxide, 5-8 wt % of silicon dioxide, and 1-3 wt % of other component; and the other component is one or more selected from a group consisting of alumina, sulfur trioxide, and iron oxide;

the additive includes a water reducer and a defoamer; the water reducer is JH-16 polycarboxylate superplasticizer, with a pH of 5-7 and a specific weight of 1.02-1.05; and the defoamer is a water-based active mineral oil defoamer, with a volatile organic compounds (VOC) content less than 0.1% and a solid content of 100%; and the reinforced fiber is a polypropylene fiber or a nylon fiber, with a strength of 106-115 cN/dtex and a length of 3-5 mm.

The present disclosure further provides a prestressing assembling method for the large-tonnage disc-shaped suspension ceramic insulator, including the following steps:

S1: preparing the primer and the adhesive material including the expansion agent and the toughening agent for future use;

S2: fixing the metal pin, the ceramic insulator body, and the metal cap in sequence, and ensuring that positions of the metal pin, the ceramic insulator body, and the metal cap correspond coaxially one by one;

S3: applying a layer of the primer evenly on the assembly interfaces of the metal pin, the ceramic insulator body, and the metal cap to be assembled with the adhesive material;

S4: injecting the adhesive material into a head of the ceramic insulator body and into the metal cap; controlling the metal pin and the metal cap to move towards the ceramic insulator body, such that the metal pin is inserted into the head of the ceramic insulator body and the head of the ceramic insulator body is inserted into the metal cap; and applying vibration to the ceramic insulator body to complete cementing; and S5: conducting curing to make the adhesive material expand after hardened and create a prestress between the ceramic insulator body and the metal pin as well as the metal cap, thereby forming the large-tonnage disc-shaped suspension ceramic insulator.

In a further improved solution, the curing includes: no less than 72 hours of natural hardening, 24-72 hours of steam curing, and more than 48 hours of water curing, before inspection is conducted.

The present disclosure further provides a device for implementing the prestressing assembling method, where the device includes a spraying and injection mechanism and a positioning mechanism;

the spraying and injection mechanism includes a connecting seat, a spray tube located at a top of the connecting seat and provided with a spray hole on an inner wall, a spray rod located at a bottom of the connecting seat and provided with a spray hole on an outer wall, and an adhesive material injection port located at a side of the connecting seat; the spray tube and the spray rod are connected to a conveying pipe for conveying the primer; and the adhesive material injection port is connected to a conveying pipe for conveying the adhesive material; and the positioning mechanism includes a rack and three layers of placement plates arranged in sequence from top to bottom on the rack; an upper placement plate is provided with multiple metal pin positioning portions, a middle placement plate is provided with multiple ceramic insulator body positioning portions, and a lower placement plate is provided with multiple metal cap positioning portions; positions of the metal pin positioning portion, the ceramic insulator body positioning portion, and the metal cap positioning portion correspond coaxially one by one; and the rack is provided with moving elements for driving the upper placement plate and the lower placement plate to rise and fall, respectively, and a vibrating element for driving the middle placement plate to vibrate.

In a further improved solution, the metal pin positioning portion includes a tapering tube and two limit boxes symmetrically located at a bottom of the tapering tube; the limit box is provided therein with an upper sliding bar, a lower sliding bar, and a moving plate that are slidable horizontally; the limit box is further provided therein with a rotatable transmission wheel; the upper sliding bar is meshed with a top of the transmission wheel; an end of the upper sliding bar is provided with a mounting plate; the mounting plate is provided with clamping wheels through elastic telescopic rods; the mounting plate is further provided with a compression rod; the compression rod and the clamping wheels extend horizontally outside the box; an extension distance of the compression rod is smaller than an extension distance of the clamping wheel corresponding to an original length of the elastic telescopic rod; the lower sliding bar is meshed with a bottom of the transmission wheel; a bottom of the lower sliding bar is provided with a protruding post; a top of the moving plate is provided with a strip groove; the protruding post is movably inserted into the strip groove; an end of the moving plate is provided with a receiving rod that extends outside the box; the limit box is further provided with a telescopic cylinder for driving the horizontal movement of the upper sliding bar;

when the telescopic cylinders drive the upper sliding bars in the two limit boxes to move away from each other, the transmission wheels drive the two lower sliding bars to move towards each other; the protruding posts move inside the strip grooves and drive the two moving plates to move towards each other, such that a minimum distance between the two clamping wheels is greater than a maximum outer diameter of top and bottom expanding portions of the metal pin, and a minimum distance between the two receiving rods is smaller than a maximum outer diameter of the bottom expanding portion of the metal pin; and thus, the metal pin is placed between the two limit boxes through the tapering tube and is received by the two receiving rods; and when the telescopic cylinders drive the upper sliding bars in the two limit boxes to move towards each other, the transmission wheels drive the two lower sliding bars to move away from each other; the protruding posts move inside the strip grooves and drive the two moving plates to move away from each other, such that the minimum distance between the two clamping wheels is less than a maximum outer diameter of the top expanding portion of the metal pin and the minimum distance between the two receiving rods is greater than the maximum outer diameter of the bottom expanding portion of the metal pin; in the process, the two clamping wheels first come into rolling contact with an outer wall of the metal pin; then, the two receiving rods detach from the bottom expanding portion of the metal pin, causing the metal pin to fall until the top expanding portion of the metal pin is clamped by the clamping wheels; and finally, the elastic telescopic rods are contracted to compress the compression rods onto the outer wall of the metal pin, thereby achieving the positioning of the metal pin.

In a further improved solution, the ceramic insulator body positioning portion is a through-hole that matches an outer wall of a fixed skirt of the ceramic insulator body in terms of shape and size; and the metal cap positioning portion is a through-hole that matches an outer wall of the metal cap in terms of shape and size.

In a further improved solution, two side edges of the upper placement plate and the lower placement plate are respectively provided with nut sleeves through connecting rods; the moving elements are located at two sides of the rack and are formed by a motor and a screw that are connected; the nut sleeve is movably sleeved on the screw; two side edges of the middle placement plate are provided with elastic joints, respectively; the middle placement plate is non-rigidly connected to the rack through the elastic joints; and a bottom of the upper placement plate is provided with multiple elastic compression sleeves that correspond to the ceramic insulator body positioning portions one by one.

The present disclosure has the following beneficial effects:

(1) On the one hand, the present disclosure achieves even compressive prestress distribution on the hardened adhesive material, the metal assembly of the steel cap and the steel pin, and the ceramic insulator body, mitigating thermal stress caused by temperature changes and improving the tensile strength of the large-tonnage disc-shaped suspension ceramic insulator assembly. By treating the assembly interfaces with the primer, the present disclosure significantly improves the assembly strength of the ceramic insulator/metal assembly, with an increase of 78% in the average compression shear strength of the contact interface.

On the other hand, the present disclosure adopts automated assembly technology, reducing the instability of manual cementing, improving the coaxiality and assembly accuracy of the metal assembly and the ceramic insulator, ensuring balanced and dispersed force distribution of the large-tonnage disc-shaped suspension ceramic insulator assembly, and overall improving product consistency and reliability.

Based on the above assembling device and method, the present disclosure improves the electromechanical performance of the large-tonnage disc-shaped suspension ceramic insulator assembly, enhances the ability of the assembly to resist rapid changes in the application environment, and ensures the reliability and stability of long-term continuous operation of the assembly. The present disclosure provides an unprecedented, comprehensive, and effective technical solution to solve the problems of fracture and zero resistance of the large-tonnage disc-shaped suspension ceramic insulator assembly.

(2) The present disclosure provides an automated assembling device that is convenient for spraying and cementing while ensuring assembly coaxiality and accuracy. The process is very simple and greatly improves assembly efficiency.

Figure 1:
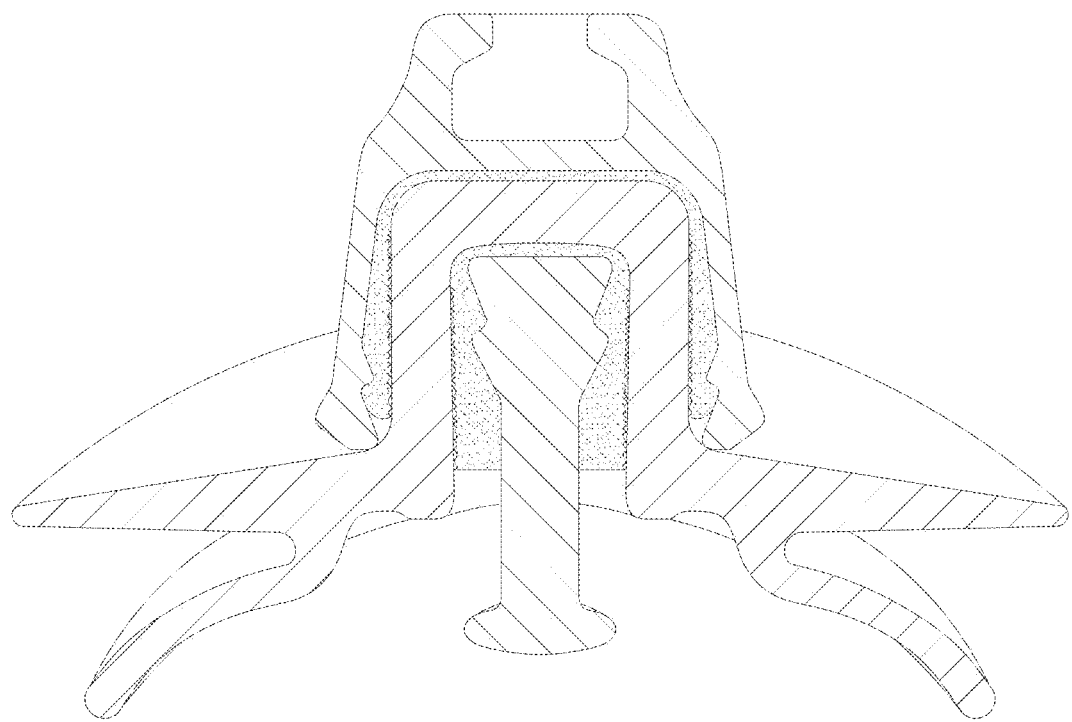
FIG. 1 is a sectional view of a large-tonnage disc-shaped suspension ceramic insulator product.

Reference Numerals: 1. connecting seat; 2. spray tube; 3. spray rod; 4. adhesive material injection port; 5. rack; 6. upper placement plate; 7. metal pin positioning portion; 701. telescopic cylinder; 702. tapering tube; 703. limit box; 704. upper sliding bar; 705. lower sliding bar; 706. moving plate; 707. transmission wheel; 708. elastic telescopic rod; 709. clamping wheel; 710. compression rod; 711. protruding post; 712. strip groove; 713. receiving rod; 8. middle placement plate; 9. ceramic insulator body positioning portion; 10. lower placement plate; 11. metal cap positioning portion; 12. moving element; 13. vibrating element; 14. nut sleeve; 15. elastic joint; and 16. elastic compression sleeve.

DETAILED DESCRIPTION OF THE EMBODIMENTS

The present disclosure will be described in further detail below with reference to the drawings. It should be pointed out herein that the following specific implementations are only intended to further explain the present disclosure, rather than to be construed as limiting the protection scope of the present disclosure. Those skilled in the art may make non-essential improvements and adjustments to the present disclosure based on the above content.

The term "large-tonnage," as used herein, refers to an insulator or an insulator assembly that has a tensile strength no less than 420 kN.

Embodiment 1

A large-tonnage disc-shaped suspension ceramic insulator includes a ceramic insulator body, and a metal pin and a metal cap coaxially assembled with the ceramic insulator body through adhesive material. The adhesive material includes an expansion agent and a toughening agent. The expansion agent is configured to make the adhesive material expand after hardening so as to create a prestress between the ceramic insulator body and the metal pin as well as the metal cap. The expansion agent has a chemical composition of 83 wt % of magnesium oxide, 6 wt % of calcium oxide, 8 wt % of silicon dioxide, and 3 wt % of other component. The other component is alumina. The toughening agent includes: 72 wt % of alpha-alumina ($\alpha$-$Al_2O_3$), 22 wt % of yttrium-stabilized zirconia with yttrium oxide in a mole fraction of 8%, and 6 wt % of a flux. The flux refers to calcium carbonate. The toughening agent is prepared by firing at 1,610° C., crushing, and sieving, with a particle size of 0.30±0.02 mm.

Assembly interfaces of the ceramic insulator body, the metal cap, and the metal pin to be assembled with the adhesive material are coated with a primer. The primer has a specific weight of 0.7816 g/cm³, and a formula including: 18 wt % of asphalt and 82 wt % of gasoline.

The adhesive material has a formula including following components by mass: 35 parts of modified cement, 20 parts of the toughening agent, 5 parts of the expansion agent, 2 parts of silica fume, 0.5 parts of an additive, and the adhesive material is doped with 2 vt % of a reinforced fiber.

The modified cement is prepared from a mixture including 85 wt % of Portland cement P.II525 and 15 wt % of sulfoaluminate cement. The Portland cement P.II525 has a specific surface area of 332.3 m²·kg⁻¹, while the sulfoaluminate cement has a specific surface area of 510.6 m²·kg⁻¹. The mixture has a particle size of D50=1.5±0.1 μm.

The additive includes a water reducer and a defoamer. The water reducer is JH-16 polycarboxylate superplasticizer, with a pH of 5 and a specific weight of 1.02. The defoamer is Sjoy-W5707 water-based active mineral oil defoamer, with a volatile organic compounds (VOC) content less than 0.1% and a solid content of 100%.

The reinforced fiber is polypropylene fiber, with a strength of 106 cN/dtex and a length of 3 mm.

Embodiment 2

Figure 2:
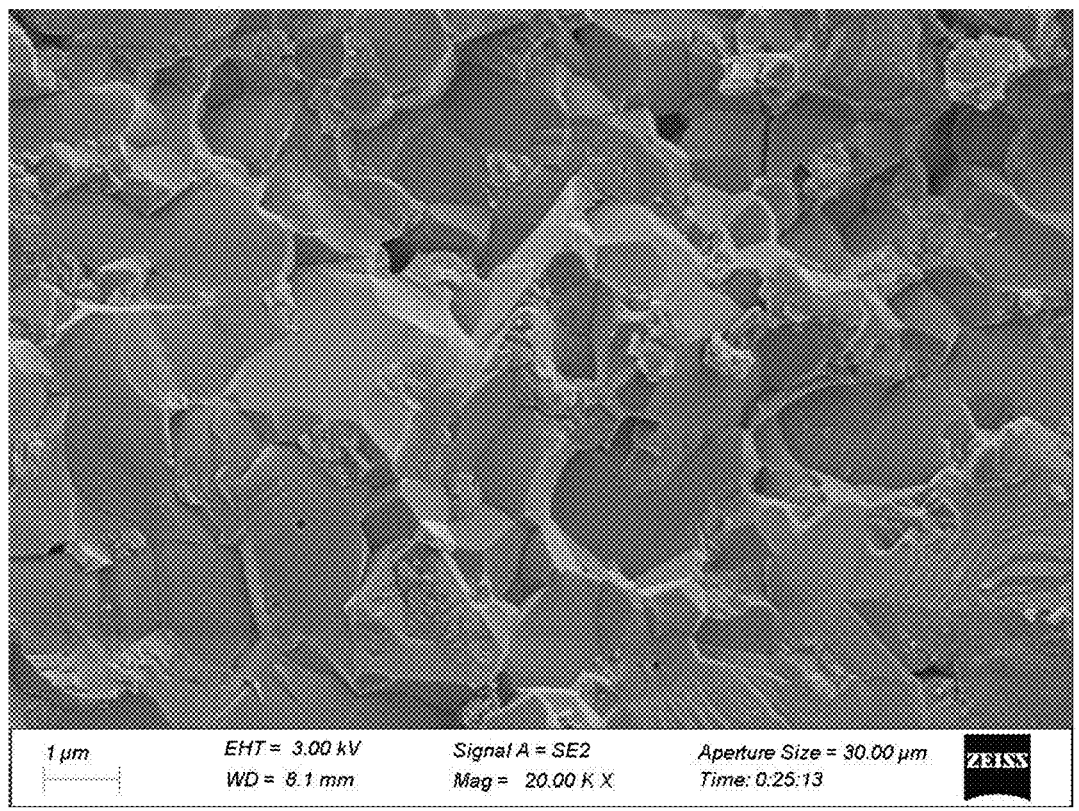
FIG. 2 is a scanning electron microscopy (SEM) image of a toughening agent.

As shown in FIG. 1, a large-tonnage disc-shaped suspension ceramic insulator includes a ceramic insulator body, and a metal pin and a metal cap coaxially assembled with the ceramic insulator body through adhesive material. The adhesive material includes an expansion agent and a toughening agent. The expansion agent is configured to make the adhesive material expand after hardening so as to create a prestress between the ceramic insulator body and the metal pin as well as the metal cap. The expansion agent has a chemical composition of 85 wt % of magnesium oxide, 5 wt % of calcium oxide, 8 wt % of silicon dioxide, and 2 wt % of other component. The other component is sulfur trioxide. The toughening agent includes: 78 wt % of alpha-alumina ($\alpha$-$Al_2O_3$), 18 wt % of yttrium-stabilized zirconia with yttrium oxide in a mole fraction of 8%, and 4 wt % of a flux. The flux refers to silicon dioxide and magnesium carbonate (weight ratio 1.2:1). The toughening agent is prepared by firing at 1,610° C., crushing, and sieving, with a particle size of 0.33±0.02 mm. The SEM image of the toughening agent is shown in FIG. 2.

Assembly interfaces of the ceramic insulator body, the metal cap, and the metal pin to be assembled with the adhesive material are coated with a primer. The primer has a specific weight of 0.8036 g/cm³, and a formula including: 22 wt % of asphalt and 78 wt % of gasoline.

The adhesive material has a formula including following components by mass: 40 parts of modified cement, 30 parts of the toughening agent, 6 parts of the expansion agent, 4 parts of silica fume, 1 part of an additive, and the adhesive material is doped with 2.2 vt % of a reinforced fiber.

The modified cement is prepared from a mixture including 88 wt % of Portland cement P.II525 and 12 wt % of sulfoaluminate cement. The Portland cement P.II525 has a specific surface area of 342.6 m²·kg⁻¹, while the sulfoaluminate cement has a specific surface area of 529.3 m²·kg⁻¹. The mixture has a particle size of D50=1.8±0.1 μm.

The additive includes a water reducer and a defoamer. The water reducer is JH-16 polycarboxylate superplasticizer, with a pH of 6 a specific weight of 1.03. The defoamer is BASF A10 water-based active mineral oil defoamer, with a volatile organic compounds (VOC) content less than 0.1% and a solid content of 100%.

The reinforced fiber is nylon fiber, with a strength of 108 cN/dtex and a length of 4 mm.

Embodiment 3

A large-tonnage disc-shaped suspension ceramic insulator includes a ceramic insulator body, and a metal pin and a metal cap coaxially assembled with the ceramic insulator body through adhesive material. The adhesive material includes an expansion agent and a toughening agent. The expansion agent is configured to make the adhesive material expand after hardening so as to create a prestress between the ceramic insulator body and the metal pin as well as the metal cap. The expansion agent has a chemical composition of 86 wt % of magnesium oxide, 6 wt % of calcium oxide, 7 wt % of silicon dioxide, and 1 wt % of other component. The other component refers to iron oxide. The toughening agent includes: 82 wt % of alpha-alumina ($\alpha$-$Al_2O_3$), 15 wt % of yttrium-stabilized zirconia with yttrium oxide in a mole fraction of 8%, and 3 wt % of a flux. The flux refers to magnesium carbonate. The toughening agent is prepared by firing at 1,610° C., crushing, and sieving, with a particle size of 0.35±0.02 mm.

Assembly interfaces of the ceramic insulator body, the metal cap, and the metal pin to be assembled with the adhesive material are coated with a primer. The primer has a specific weight of 0.8193 g/cm³, and a formula including: 25 wt % of asphalt and 75 wt % of gasoline.

The adhesive material has a formula including following components by mass: 50 parts of modified cement, 35 parts of the toughening agent, 8 parts of the expansion agent, 6 parts of silica fume, 2 parts of an additive, and the cement is doped with 2.5 vt % of a reinforced fiber.

The modified cement is prepared from a mixture including 90 wt % of Portland cement P.II525 and 10 wt % of sulfoaluminate cement. The Portland cement P.II525 has a specific surface area of 349.3 m²·kg⁻¹, while the sulfoaluminate cement has a specific surface area of 550.1 m²·kg⁻¹. The mixture has a particle size of D50=2.3±0.1 μm.

The additive includes a water reducer and a defoamer. The water reducer is JH-16 polycarboxylate superplasticizer, with a pH of 7 a specific weight of 1.05. The defoamer is BASF A10 water-based active mineral oil defoamer, with a volatile organic compounds (VOC) content less than 0.1% and a solid content of 100%.

The reinforced fiber is polypropylene fiber, with a strength of 115 cN/dtex and a length of 5 mm.

Comparative Example 1

A large-tonnage disc-shaped suspension ceramic insulator includes a ceramic insulator body, and a metal pin and a metal cap coaxially assembled with the ceramic insulator body through adhesive material. The adhesive material includes an expansion agent and a toughening agent. The expansion agent is configured to make the adhesive material expand after hardening so as to create a prestress between the ceramic insulator body and the metal pin as well as the metal cap. The expansion agent has a chemical composition of 85 wt % of magnesium oxide, 5 wt % of calcium oxide, 8 wt % of silicon dioxide, and 2 wt % of other component.

The other component refers to sulfur trioxide. The toughening agent includes: 78 wt % of alpha-alumina ($\alpha$-$Al_2O_3$), 18 wt % of yttrium-stabilized zirconia with yttrium oxide in a mole fraction of 8%, and 4 wt % of a flux. The flux refers to silicon dioxide and magnesium carbonate (weight ratio 1.2:1). The toughening agent is prepared by firing at 1,610° C., crushing, and sieving, with a particle size of 0.33±0.02 mm.

The adhesive material has a formula including following components by mass: 40 parts of modified cement, 30 parts of the toughening agent, 6 parts of the expansion agent, 4 parts of silica fume, 1 part of an additive, and the adhesive material is doped with 2.2 vt % of a reinforced fiber.

The modified cement is prepared from a mixture including 88 wt % of Portland cement P.II525 and 12 wt % of sulfoaluminate cement. The Portland cement P.II525 has a specific surface area of 342.6 $m^2$·$kg^{-1}$, while the sulfoaluminate cement has a specific surface area of 529.3 $m^2$·$kg^{-1}$. The mixture has a particle size of D50=1.8±0.1 μm.

The additive includes a water reducer and a defoamer. The water reducer is JH-16 polycarboxylate superplasticizer, with a pH of 6 a specific weight of 1.03. The defoamer is BASF A10 water-based active mineral oil defoamer, with a volatile organic compounds (VOC) content less than 0.1% and a solid content of 100%.

The reinforced fiber is nylon fiber, with a strength of 108 cN/dtex and a length of 4 mm.

Comparative Example 2

A large-tonnage disc-shaped suspension ceramic insulator includes a ceramic insulator body, and a metal pin and a metal cap coaxially assembled with the ceramic insulator body through adhesive material. The adhesive material includes an expansion agent and a toughening agent. The expansion agent is configured to make the adhesive material expand after hardening so as to create a prestress between the ceramic insulator body and the metal pin as well as the metal cap. The expansion agent has a chemical composition of 85 wt % of magnesium oxide, 5 wt % of calcium oxide, 8 wt % of silicon dioxide, and 2 wt % of other component. The other component refers to sulfur trioxide.

Assembly interfaces of the ceramic insulator body, the metal cap, and the metal pin to be assembled with the adhesive material are coated with a primer. The primer has a specific weight of 0.8036 g/$cm^3$, and a formula including: 22 wt % of asphalt and 78 wt % of gasoline.

The adhesive material has a formula including following components by mass: 40 parts of modified cement, 30 parts of the toughening agent (common alumina particle available on the market), 6 parts of the expansion agent, 4 parts of silica fume, 1 part of an additive, and the adhesive material is doped with 2.2 vt % of a reinforced fiber.

The modified cement is prepared from a mixture including 88 wt % of Portland cement P.II525 and 12 wt % of sulfoaluminate cement. The Portland cement P.II525 has a specific surface area of 342.6 $m^2$·$kg^{-1}$, while the sulfoaluminate cement has a specific surface area of 529.3 $m^2$·$kg^{-1}$. The mixture has a particle size of D50=1.8±0.1 μm.

The additive includes a water reducer and a defoamer. The water reducer is JH-16 polycarboxylate superplasticizer, with a pH of 6 a specific weight of 1.03. The defoamer is BASF A10 water-based active mineral oil defoamer, with a volatile organic compounds (VOC) content less than 0.1% and a solid content of 100%.

The reinforced fiber is nylon fiber, with a strength of 108 cN/dtex and a length of 4 mm.

Comparative Example 3

A large-tonnage disc-shaped suspension ceramic insulator includes a ceramic insulator body, and a metal pin and a metal cap coaxially assembled with the ceramic insulator body through adhesive material.

Assembly interfaces of the ceramic insulator body, the metal cap, and the metal pin to be assembled with the adhesive material are coated with a primer. The primer has a specific weight of 0.8036 g/$cm^3$, and a formula including: 22 wt % of asphalt and 78 wt % of gasoline.

The adhesive material has a formula including following components by mass: 40 parts of modified cement, 30 parts of a toughening agent, 4 parts of silica fume, 1 part of an additive, and the adhesive material is doped with 2.2 vt % of a reinforced fiber.

The modified cement is prepared from a mixture including 88 wt % of Portland cement P.II525 and 12 wt % of sulfoaluminate cement. The Portland cement P.II525 has a specific surface area of 342.6 $m^2$·$kg^{-1}$, while the sulfoaluminate cement has a specific surface area of 529.3 $m^2$·$kg^{-1}$. The mixture has a particle size of D50=1.8±0.1 μm.

The toughening agent includes: 78 wt % of alpha-alumina ($\alpha$-$Al_2O_3$), 18 wt % of yttrium-stabilized zirconia with yttrium oxide in a mole fraction of 8%, and 4 wt % of a flux. The flux refers to silicon dioxide and magnesium carbonate (weight ratio 1.2:1). The toughening agent is prepared by firing at 1,610° C., crushing, and sieving, with a particle size of 0.33±0.02 mm.

The additive includes a water reducer and a defoamer. The water reducer is JH-16 polycarboxylate superplasticizer, with a pH of 6 a specific weight of 1.03. The defoamer is BASF A10 water-based active mineral oil defoamer, with a volatile organic compounds (VOC) content less than 0.1% and a solid content of 100%.

The reinforced fiber is nylon fiber, with a strength of 108 cN/dtex and a length of 4 mm.

The assembling methods of Embodiments 1 to 3 and Comparative Examples 1 to 3 include the following steps.

S1. The primer (if any) and the adhesive material including the expansion agent (if any) and the toughening agent (if any) are prepared for future use.

S2. The metal pin, the ceramic insulator body, and the metal cap are fixed in sequence, and positions of the metal pin, the ceramic insulator body, and the metal cap correspond coaxially one by one.

S3. A layer of primer (if any) is applied evenly on the assembly interfaces of the metal pin, the ceramic insulator body, and the metal cap to be assembled with the adhesive material.

S4. The adhesive material is injected into a head of the ceramic insulator body and into the metal cap. The metal pin and the metal cap are controlled to move towards the ceramic insulator body, such that the metal pin is inserted into the head of the ceramic insulator body and the head of the ceramic insulator body is inserted into the metal cap. Vibration is applied to the ceramic insulator body to complete cementing.

S5. Curing (72 hours of natural hardening, 36 hours of steam curing, and 60 hours of water curing) is conducted to make the adhesive material expand after hardened and create a prestress between the ceramic insulator body and the metal pin as well as the metal cap, thereby forming the large-tonnage disc-shaped suspension ceramic insulator.

Performance tests are conducted on the ceramic insulator products of Embodiments 1 to 3 and Comparative Examples 1 to 3, and test items are as follows.

(1) Electromechanical failure load. According to the GB/T 1001.1-2003 standard, a maximum tensile load that ceramic insulators can withstand is measured.

(2) Vibration fatigue strength. When an average value of an alternating vibration load is 26.7% of a guaranteed value of the electromechanical load, the fatigue limit load amplitude after 2 million cycles is the percentage of the electromechanical failure load value.

(3) Interface compression shear strength. The compression shear strength of the cementing interface of the ceramic insulators is tested using an Instron-5569 electronic universal material testing machine (0.5 mm/min).

(4) Pressure braise expansion ratio. According to the JB 4307-2004-T standard, the pressure braise expansion ratio of the adhesive material is measured.

The test results are shown in Table 1 below.

TABLE 1

Performance test results of ceramic insulator products

| | Embodiment 1 | Embodiment 2 | Embodiment 3 | Comparative Example 1 | Comparative Example 2 | Comparative Example 3 |
|---|---|---|---|---|---|---|
| Electromechanical failure load/kN | 626 | 652 | 647 | 619 | 537 | 435 |
| Vibration fatigue strength/% | 6.8 | 7.5 | 7.2 | 6.7 | 6.2 | 6.0 |
| Interface compression shear strength/MPa | 3.41 | 3.73 | 3.36 | 2.10 | 3.38 | 3.17 |
| Pressure braise expansion ratio/% | 0.04 | 0.04 | 0.06 | 0.05 | 0.03 | 0.03 |

From Table 1, it can be seen that the ceramic insulator products of Embodiments 1 to 3 of the present disclosure have outstanding mechanical properties, with a mechanical and electrical failure load of 626-652 kN, significantly exceeding the requirement of a large tonnage of 550 kN, a vibration fatigue strength of 6.8-7.5, an interface compression shear strength of 3.36-3.53 MPa, and a pressure braise expansion ratio below 0.10%. In comparative example 1, no primer is used. Compared with Comparative Example 1, Embodiment 2 significantly increases the interface compression shear strength, with an increase of 78%. In comparative example 2, commercially available ordinary alumina particle is used as the toughening agent. Compared with Comparative Example 2, Embodiment 2 significantly increases the electromechanical failure load, with an increase of 21%. In comparative example 3, no expansion agent is used. Compared with Comparative Example 3, Embodiment 2 significantly increases the electromechanical failure load by 50%, indicating that the prestressing assembling technology used in the present disclosure plays a significant role.

As shown in FIGS. 3 to 11, the present disclosure further provides a device specifically designed for implementing the above-mentioned prestressing assembling method. The device includes a spraying and injection mechanism and a positioning mechanism.

The spraying and injection mechanism includes a connecting seat 1, a spray tube 2 located at a top of the connecting seat 1 and provided with a spray hole on an inner wall, a spray rod 3 located at a bottom of the connecting seat 1 and provided with a spray hole on an outer wall, and an adhesive material injection port 4 located at a side of the connecting seat 1. The spray tube 2 and the spray rod 3 are connected to a conveying pipe for conveying the primer. The adhesive material injection port 4 is connected to a conveying pipe for conveying the adhesive material. The spray tube 2 is configured to spray the primer onto target cementing surface positions at an outer wall of the metal pin and an outer wall of the head of the ceramic insulator body. Therefore, an inner diameter of the spray tube 2 is larger than an outer diameter of the head of the ceramic insulator body. The spray rod 3 is configured to spray the primer onto target cementing surface positions at an inner wall of the head of the ceramic insulator body and an inner wall of the metal cap. Therefore, an outer diameter of the spray rod 3 is smaller than an inner diameter of the head of the ceramic insulator body. The adhesive material injection port 4 is configured to inject the adhesive material into the head of the ceramic insulator body and into the metal cap. When in use, the spraying and injection mechanism can be manually held for spraying and injection. Alternatively, a three-dimensional mobile module can be added to drive the spraying and injection mechanism to move to a designated position for spraying and injection.

The positioning mechanism includes a rack 5 and three layers of placement plates arranged in sequence from top to bottom on the rack 5. An upper placement plate 6 is provided with multiple metal pin positioning portions 7, a middle placement plate 8 is provided with multiple ceramic insulator body positioning portions 9, and a lower placement plate 10 is provided with multiple metal cap positioning portions 11. Positions of the metal pin positioning portion 7, the ceramic insulator body positioning portion 9, and the metal cap positioning portion 11 correspond coaxially one by one. In this way, the cementing of multiple ceramic insulators can be conducted simultaneously at once. The rack 5 is provided with moving elements 12 for driving the upper placement plate 6 and the lower placement plate 10 to rise and fall, respectively, and a vibrating element 13 (micro vibration motor) for driving the middle placement plate 8 to vibrate.

In addition, the ceramic insulator body positioning portion 9 is a through-hole that matches an outer wall of a fixed skirt of the ceramic insulator body in terms of shape and size. The metal cap positioning portion 11 is a through-hole that matches an outer wall of the metal cap in terms of shape and size. The ceramic insulator body and the metal cap are automatically positioned after being placed into the through-holes, respectively.

Two side edges of the upper placement plate 6 and the lower placement plate 10 are respectively provided with nut sleeves 14 through connecting rods. The moving elements 12 are located at two sides of the rack 5 and are formed by a motor and a screw that are connected. The nut sleeve 14 is movably sleeved on the screw. Two side edges of the middle placement plate 8 are provided with elastic joints 15, respectively. The middle placement plate 8 is non-rigidly connected to the rack 5 through the elastic joints 15. A bottom of the upper placement plate 6 is provided with multiple elastic compression sleeves 16 that correspond to the ceramic insulator body positioning portions 9 one by one.

For the convenience of quick disassembly and assembly in the future, the metal pin cannot be positioned by a through-hole positioning means. Here, the metal pin positioning portion 7 can adopt an electromagnetic suction positioning means. That is, the bottom of the upper placement plate 6 is provided with multiple electromagnetic suction seats. A bottom surface of the electromagnetic suction seat is provided with a slot that matches an expanding portion at a top of the metal pin. The top of the metal pin is inserted into the slot to energize the electromagnetic suction seat, thereby completing the positioning of the metal pin. Disassembly and assembly are completed on a power-off basis.

Preferably, there is another alternative solution for the metal pin positioning portion 7, which is more convenient to operate. The metal pin positioning portion includes a tapering tube 702 and two limit boxes 703 symmetrically located at a bottom of the tapering tube 702. The tapering tube 702 is wide at a top and narrow at the bottom. The limit box 703 is provided therein with an upper sliding bar 704, a lower sliding bar 705, and a moving plate 706 that are slidable horizontally through sliding rails. The limit box 703 is further provided therein with a transmission wheel 707 that is rotatable through a shaft seat. The upper sliding bar 704 is meshed with a top of the transmission wheel 707. An end of the upper sliding bar 704 is provided with a mounting plate. The mounting plate is provided with clamping wheels 709 through elastic telescopic rods 708. The mounting plate is further provided with a compression rod 710. The compression rod 710 and the clamping wheels 709 extend horizontally outside the box. An extension distance of the compression rod 710 is smaller than an extension distance of the clamping wheel 709 corresponding to an original length of the elastic telescopic rod 708. The lower sliding bar 705 is meshed with a bottom of the transmission wheel 707. A bottom of the lower sliding bar 705 is provided with a protruding post 711. A top of the moving plate 706 is provided with a strip groove 712. The protruding post 711 is movably inserted into the strip groove 712. An end of the moving plate 706 is provided with a receiving rod 713 that extends outside the box. The limit box 703 is further provided with a telescopic cylinder 701, such as an air cylinder, for driving the horizontal movement of the upper sliding bar 704. All air cylinders of the metal pin positioning portions 7 are connected to a same air source to achieve synchronous driving.

When the telescopic cylinders 701 drive the upper sliding bars 704 in the two limit boxes 703 to move away from each other, the transmission wheels 707 drive the two lower sliding bars 705 to move towards each other. The protruding posts 711 move inside the strip grooves 712 and drive the two moving plates 706 to move towards each other, such that a minimum distance between the two clamping wheels 709 is greater than a maximum outer diameter of top and bottom expanding portions of the metal pin, and a minimum distance between the two receiving rods 713 is smaller than a maximum outer diameter of the bottom expanding portion of the metal pin. Thus, the metal pin is placed between the two limit boxes 703 through the tapering tube 702 and is received by the two receiving rods 713.

When the telescopic cylinders 701 drive the upper sliding bars 704 in the two limit boxes 703 to move towards each other, the transmission wheels 707 drive the two lower sliding bars 705 to move away from each other. The protruding posts 711 move inside the strip grooves 712 and drive the two moving plates 706 to move away from each other, such that the minimum distance between the two clamping wheels 709 is less than a maximum outer diameter of the top expanding portion of the metal pin and the minimum distance between the two receiving rods 713 is greater than the maximum outer diameter of the bottom expanding portion of the metal pin. During this process, the two clamping wheels 709 first come into rolling contact with the outer wall of the metal pin. Then, the two receiving rods 713 detach from the bottom expanding portion of the metal pin, causing the metal pin to fall until the top expanding portion of the metal pin is clamped by the clamping wheels 709. Finally, the elastic telescopic rods 708 are contracted to compress the compression rods 710 onto the outer wall of the metal pin, thereby achieving the positioning of the metal pin.

A specific usage process of this device is as follows.

Figure 3:
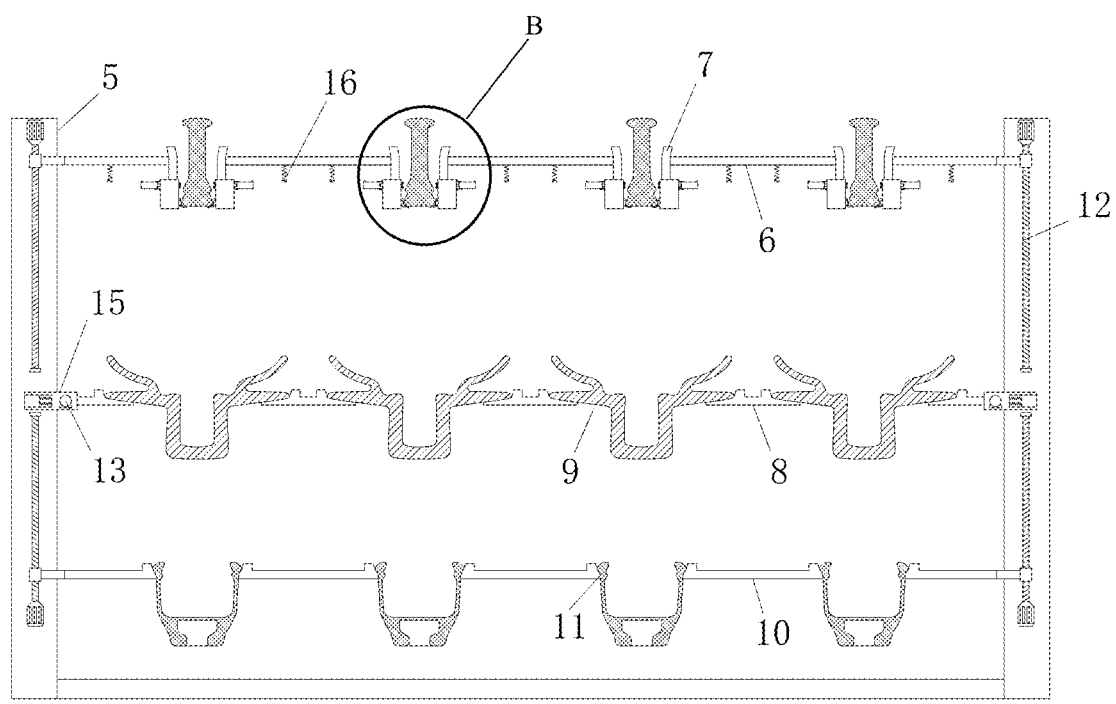
FIG. 3 is a schematic diagram showing a positioning mechanism provided with a ceramic insulator body, a metal pin, and a metal cap.
Figure 4:
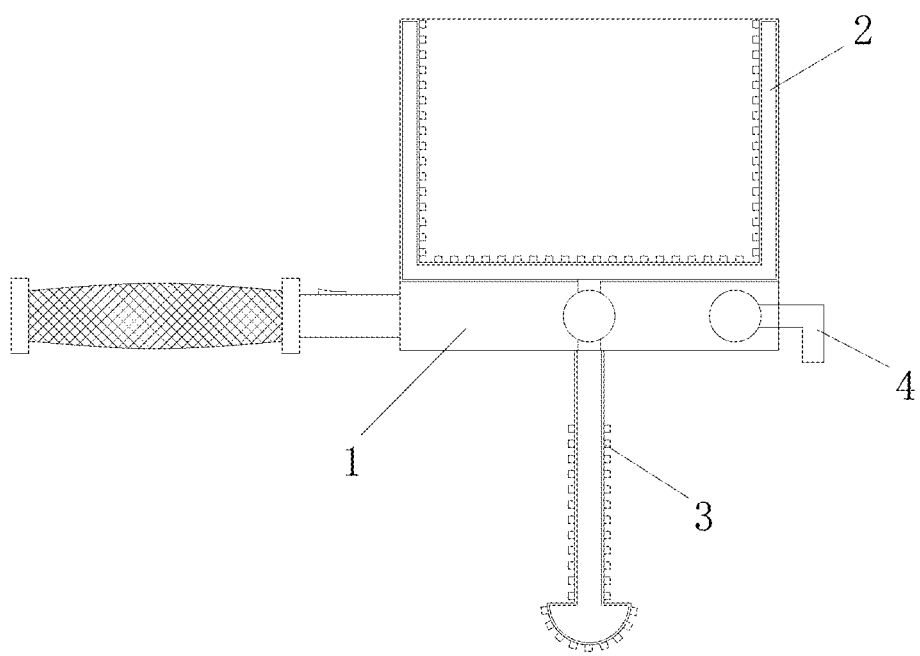
FIG. 4 is a schematic diagram of a spraying and injection mechanism.
Figure 5:
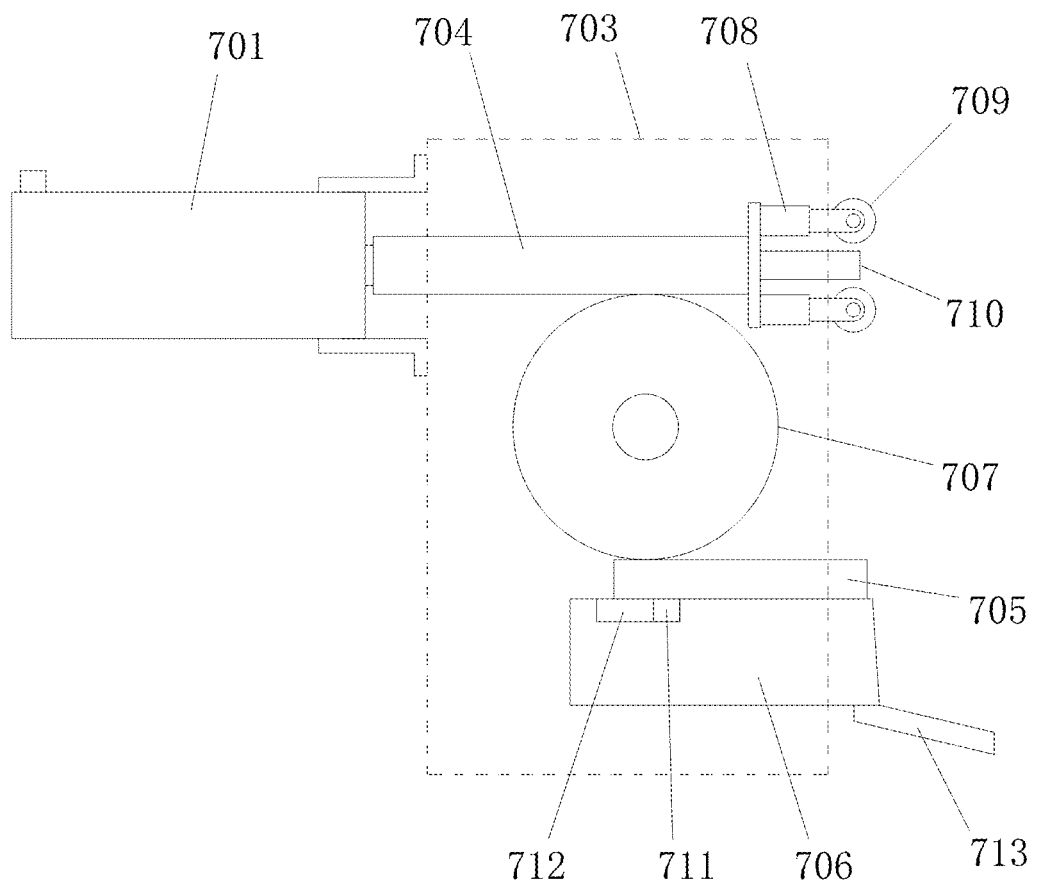
FIG. 5 is a schematic diagram of a limit box and an accessory structure thereof.
Figure 9:
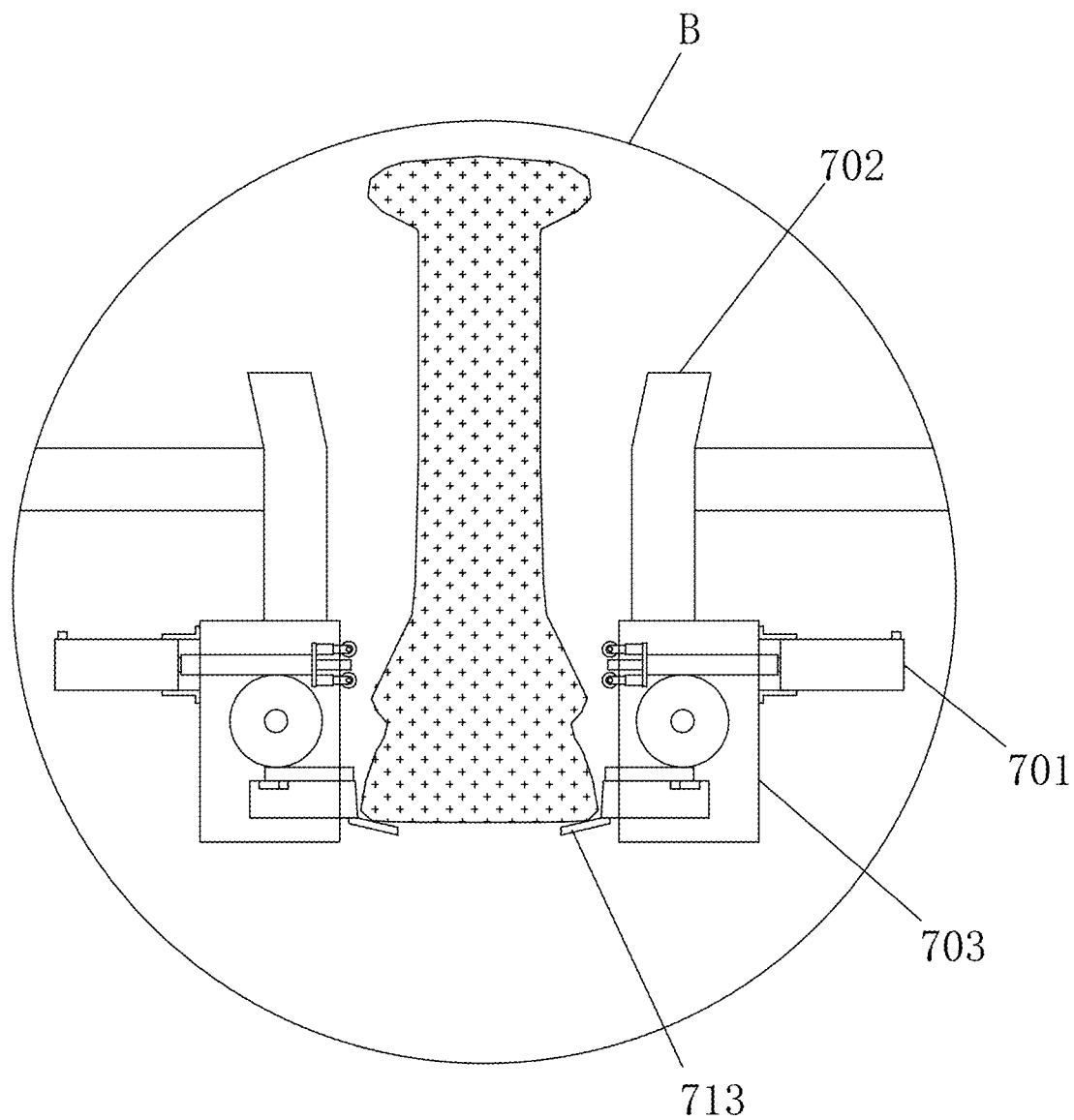
FIG. 9 is a detail of position B shown in FIG. 3.

Firstly, multiple sets of ceramic insulator assemblies to be cemented are placed at corresponding positions of the rack 5, as shown in FIGS. 3 and 9. The metal cap is placed at the metal cap positioning portion 11 and the ceramic insulator body is placed at the ceramic insulator body positioning portion 9, before they are automatically positioned. The metal pin is placed between the two limit boxes 703 through the tapering tube 702, and the receiving rod 713 prevents the metal pin from continuing to fall. At this time the metal pin is not accurately positioned.

Figure 6:
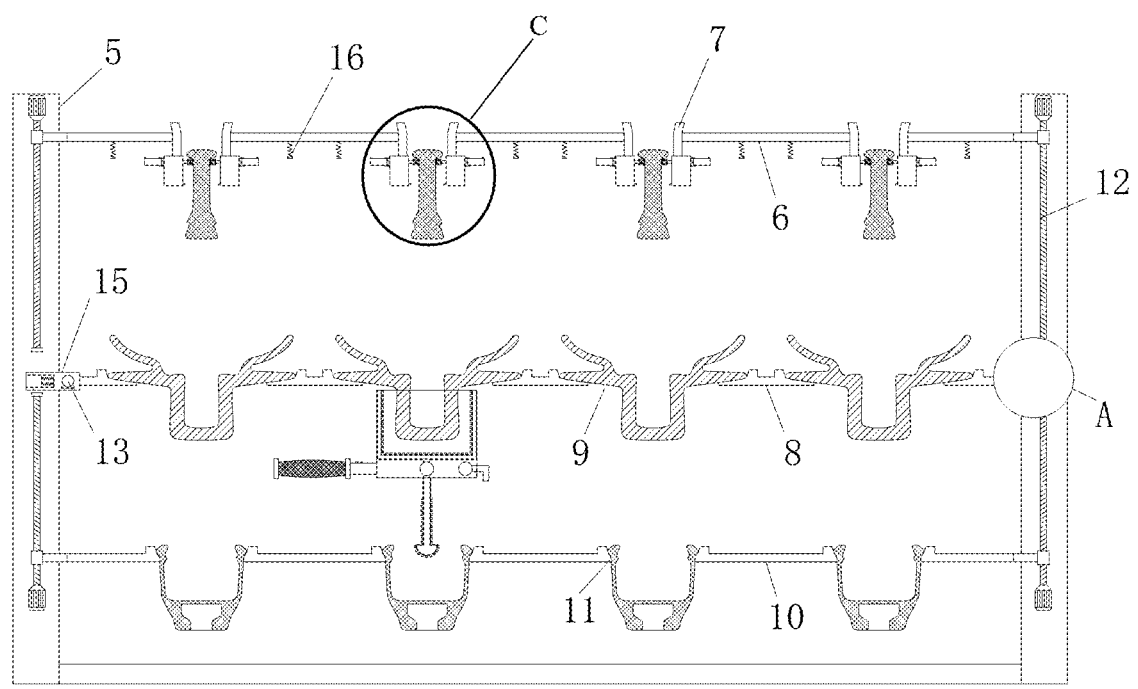
FIG. 6 is a schematic diagram showing the ceramic insulator body, the metal pin, and the metal cap positioned on the positioning mechanism.
Figure 7:
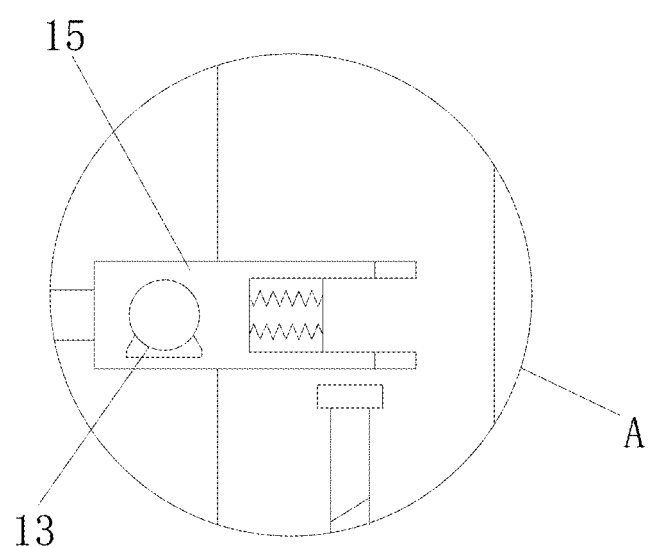
FIG. 7 is a detail of portion A shown in FIG. 6.
Figure 10:
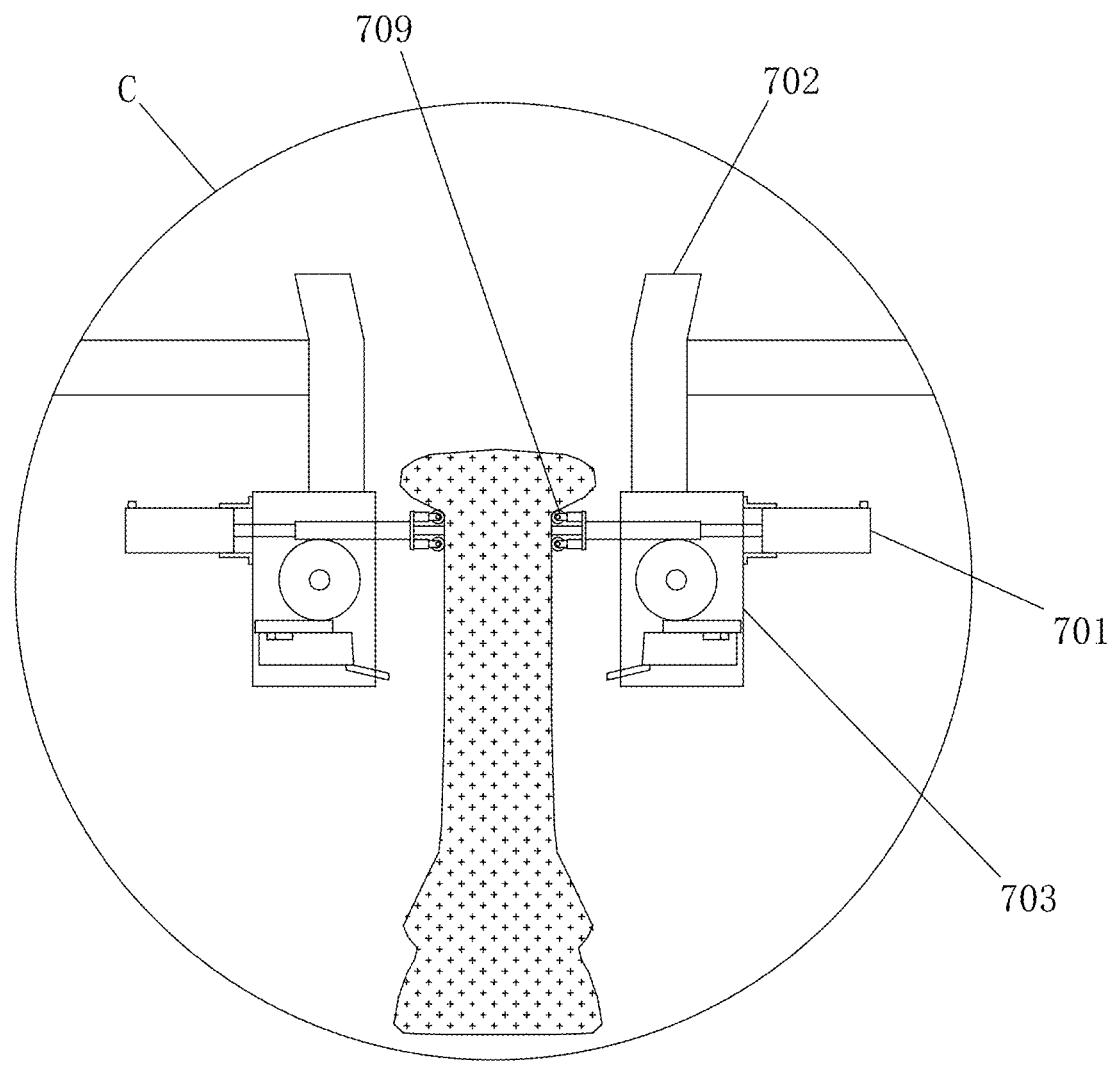
FIG. 10 is a detail of position C shown in FIG. 6.

Then, the telescopic cylinders 701 are activated to move the two upper sliding bars 704 towards each other. The transmission wheels 707 drive the two lower sliding bars 705 to move away from each other. Due to the arrangement of the protruding posts 711 and the strip grooves 712, the receiving rods 713 will not immediately move away from each other, but will continue to prevent the metal pin from falling off. As the two upper sliding bars 704 move towards each other, the minimum distance between the two clamping wheels 709 (i.e. the distance between wheel surfaces on opposite sides) is smaller than the maximum outer diameter of the top expanding portion of the metal pin, and the clamping wheels 709 gradually contact the outer wall of the metal pin. The receiving rods 713 begin to move away from each other, causing the metal pin to fall off. The clamping wheels 709 roll against the outer wall of the metal pin until they are blocked by the top expanding portion of the metal pin. Then, the two upper sliding bars 704 continue to move towards each other to drive the elastic telescopic rod 708 to compress, such that the compression rod 710 is pressed into contact with the top position of the metal pin. Due to friction, the metal pin is fixed, thereby completing the positioning of the metal pin, as shown in FIGS. 6 and 10. Thus, the spraying and injection mechanism can be activated to conduct spraying of the primer and injection of the adhesive material in sequence.

Figure 8:
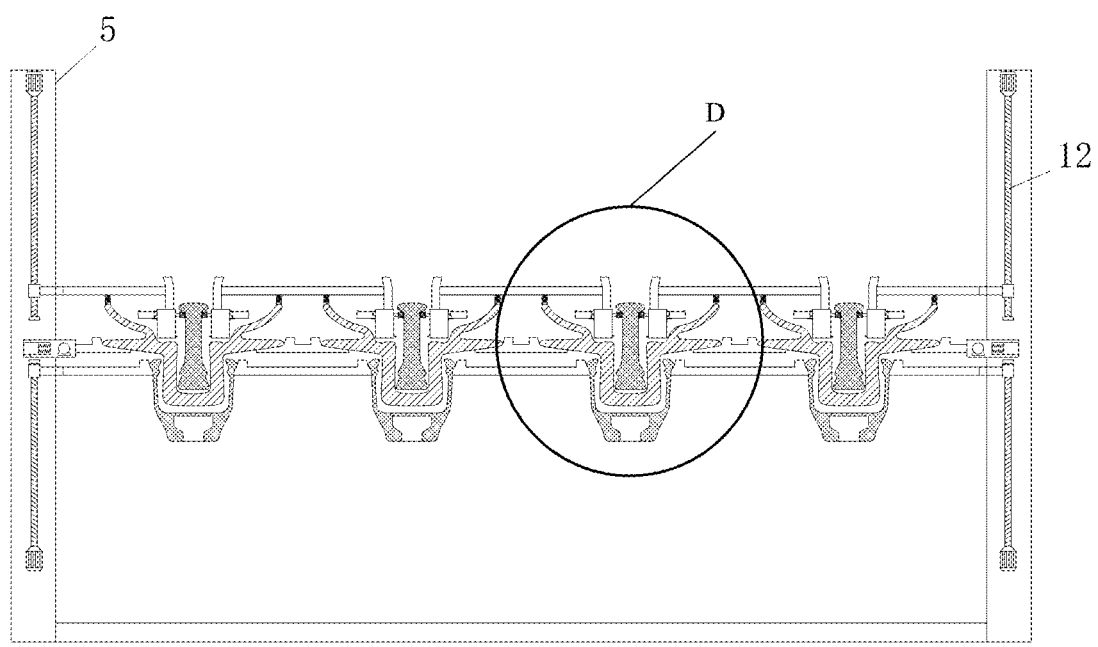
FIG. 8 is a schematic diagram showing the ceramic insulator body, the metal pin, and the metal cap assembled on the positioning mechanism.
Figure 11:
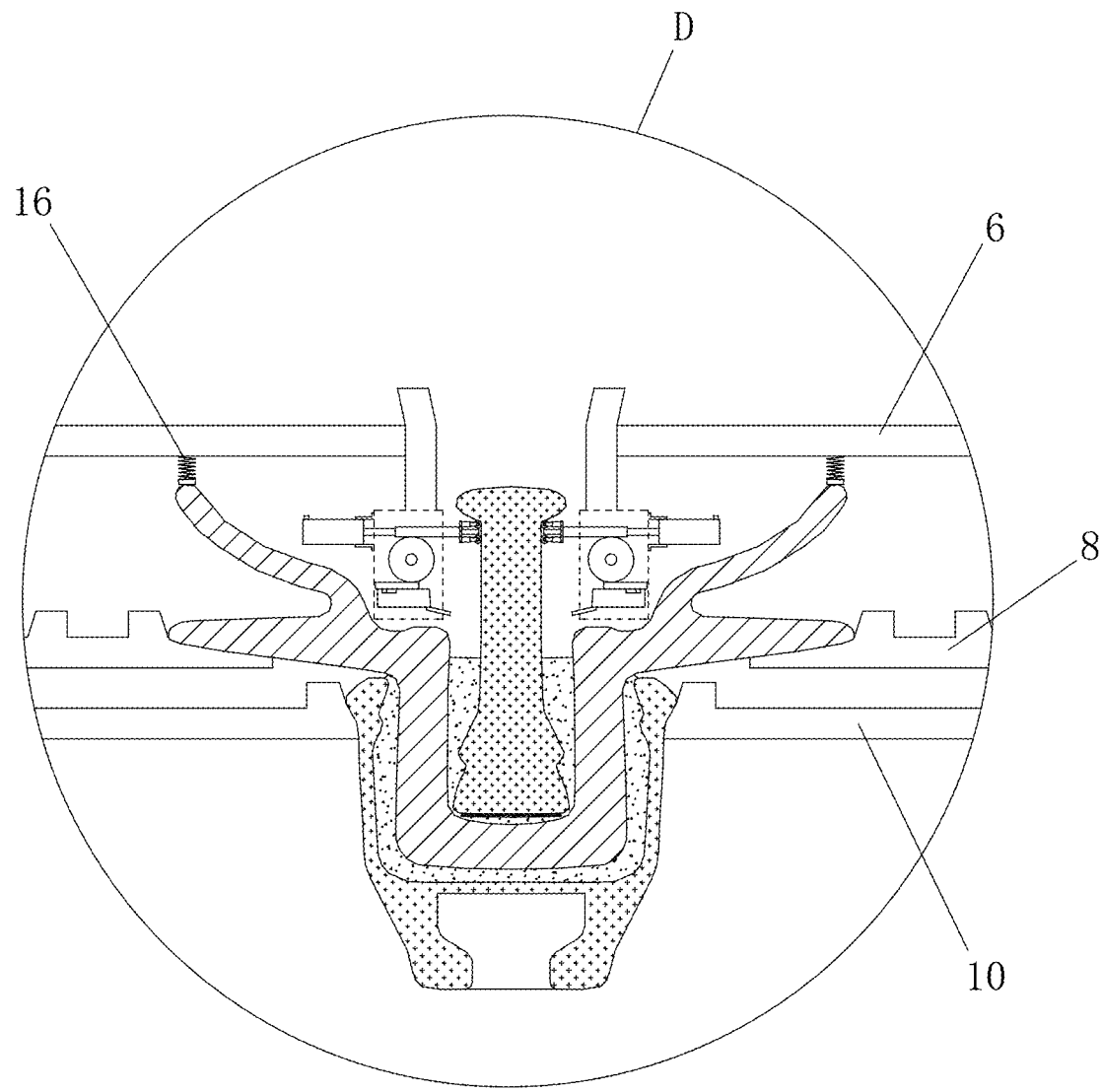
FIG. 11 is a detail of position D shown in FIG. 8.

Firstly, the moving element 12 is controlled to lower the upper placement plate 6. The metal pin is inserted into a target position inside the head of the ceramic insulator body, and the elastic compression sleeve 16 is tightly compressed against an edge of the skirt of the ceramic insulator body. In this way, the ceramic insulator body will not be lifted and the vibration effect will be enhanced. The moving element 12 is further controlled to raise the lower placement plate 10, such that the head of the ceramic insulator body is inserted into a target position inside the metal cap. The vibrating element 13 is activated to apply vibration to the ceramic insulator body. The vibration causes the adhesive material to be compacted, as shown in FIGS. 8 and 11.

After the adhesive material reaches certain hardness, the telescopic cylinders 701 are activated. The two upper sliding bars 704 move away from each other and drive the clamping wheels 709 and the compression rods 710 to detach from the metal pin. The transmission wheels 707 drive two lower sliding bars 705 to move towards each other. Similarly, due to the arrangement of the protruding posts 711 and the strip grooves 712, the receiving rods 713 will not immediately move towards each other. Thus, the metal pin positioning portion 7 as a whole will not obstruct the metal pin. The moving element 12 is controlled to return the upper placement plate 6 and the lower placement plate 10 to their original positions, thereby quickly disassembling the placement plates. The metal pin and the metal cap are fixed to the ceramic insulator body, and the entire product can be directly removed for later curing.

Finally, the telescopic cylinders 701 continue to drive the two upper sliding bars 704 to move away from each other, causing the two receiving rods 713 to move towards each other. The clamping wheels 709 and the receiving rods 713 all return to their original positions, preparing for cementing again.

Five ceramic insulator samples prepared by the above device and method are randomly selected for coaxiality testing, and the test results are shown in Table 2 below. It can be seen that the coaxiality of each sample is relatively high.

TABLE 2

Coaxiality test results of ceramic insulator samples

| Serial Number | Sample A | Sample B | Sample C | Sample D | Sample E |
|---|---|---|---|---|---|
| Coaxiality φ/mm | 0.01 | 0.01 | 0.03 | 0.01 | 0.02 |

The above embodiments merely represent several implementations of the present disclosure. The descriptions are specific and detailed, but they should not be construed as limiting the patent scope of the present disclosure. It should be noted that those of ordinary skill in the art can further make several variations and improvements without departing from the concept of the present disclosure, and all of these fall within the protection scope of the present disclosure.

What is claimed is:

1. A large-tonnage disc-shaped suspension ceramic insulator, comprising a ceramic insulator body, a metal pin and a metal cap, wherein the metal pin and the metal cap are coaxially assembled with the ceramic insulator body through adhesive material, and the adhesive material comprises an expansion agent and a toughening agent;

the expansion agent is configured to make the adhesive material expand after hardened so as to create a prestress between the ceramic insulator body and the metal pin and between the ceramic insulator body and the metal cap; the toughening agent comprises: 72-82 wt % of alpha-alumina ($\alpha$-$Al_2O_3$), 15-22 wt % of yttrium-stabilized zirconia with yttrium oxide in a mole fraction of 8%, and 3-7 wt % of a flux; the flux is one or more selected from a group consisting of calcium carbonate, silicon dioxide and magnesium carbonate; and the toughening agent is prepared by firing at 1,610° C., crushing, and sieving, with a particle size of 0.30-0.35 mm;

the adhesive material has a formula comprising following components by mass: 35-50 parts of modified cement, 20-35 parts of the toughening agent, 5-8 parts of the expansion agent, 2-6 parts of silica fume, 0.5-2.0 parts of an additive, and the adhesive material is doped with 2-2.5 vt % of a reinforced fiber;

the modified cement is prepared from a mixture comprising 85-90 wt % of Portland cement P.II525 and 10-15 wt % of sulfoaluminate cement; the Portland cement P.II525 has a specific surface area of 330-350 $m^2 \cdot kg^{-1}$, while the sulfoaluminate cement has a specific surface area of 510-550 $m^2 \cdot kg^{-1}$; and the mixture has a particle size of D50=1.5-2.3 μm;

the expansion agent has a chemical composition of 83-86 wt % of magnesium oxide, 4-6 wt % of calcium oxide, 5-8 wt % of silicon dioxide, and 1-3 wt % of other component; and the other component is one or more selected from a group consisting of alumina, sulfur trioxide, and iron oxide;

the additive comprises a water reducer and a defoamer; the water reducer is JH-16 polycarboxylate superplasticizer, with a pH of 5-7 and a specific weight of 1.02-1.05; and the defoamer is a water-based active mineral oil defoamer, with a volatile organic compounds (VOC) content less than 0.1% and a solid content of 100%;

the reinforced fiber is a polypropylene fiber or a nylon fiber, with a strength of 106-115 cN/dtex and a length of 3-5 mm; and assembly interfaces of the ceramic insulator body, the metal cap, and the metal pin to be assembled with the adhesive material are coated with a primer.

2. The large-tonnage disc-shaped suspension ceramic insulator according to claim 1, wherein the primer has a specific weight of 0.78-0.82 $g/cm^3$, and a formula comprising: 18-25 wt % of asphalt and 75-82 wt % of gasoline.

3. A prestressing assembling method for the large-tonnage disc-shaped suspension ceramic insulator according to claim 1, comprising the following steps:

S1: preparing the primer and the adhesive material comprising the expansion agent and the toughening agent for future use;

S2: fixing the metal pin, the ceramic insulator body, and the metal cap in sequence, and ensuring that positions of the metal pin, the ceramic insulator body, and the metal cap correspond coaxially one by one;

S3: applying a layer of the primer evenly on the assembly interfaces of the metal pin, the ceramic insulator body, and the metal cap to be assembled with the adhesive material;

S4: injecting the adhesive material into a head of the ceramic insulator body and into the metal cap; controlling the metal pin and the metal cap to move towards the ceramic insulator body, such that the metal pin is inserted into the head of the ceramic insulator body and the head of the ceramic insulator body is inserted into the metal cap; and applying vibration to the ceramic insulator body to complete cementing; and S5: conducting curing to make the adhesive material expand after hardened and create a prestress between the ceramic insulator body and the metal pin and between the ceramic insulator body and the metal cap, thereby forming the large-tonnage disc-shaped suspension ceramic insulator.

4. The prestressing assembling method according to claim 3, wherein the curing comprises: no less than 72 hours of natural hardening, 24-72 hours of steam curing, and more than 48 hours of water curing, before inspection is conducted.

5. A device for implementing the prestressing assembling method according to claim 3, wherein the device comprises a spraying and injection mechanism and a positioning mechanism;

the spraying and injection mechanism comprises a connecting seat, a spray tube located at a top of the connecting seat and provided with a spray hole on an inner wall, a spray rod located at a bottom of the connecting seat and provided with a spray hole on an outer wall, and an adhesive material injection port located at a side of the connecting seat; the spray tube and the spray rod are connected to a conveying pipe for conveying the primer; and the adhesive material injection port is connected to a conveying pipe for conveying the adhesive material; and the positioning mechanism comprises a rack and three layers of placement plates arranged in sequence from top to bottom on the rack; an upper placement plate is provided with multiple metal pin positioning portions, a middle placement plate is provided with multiple ceramic insulator body positioning portions, and a lower placement plate is provided with multiple metal cap positioning portions; positions of the metal pin positioning portion, the ceramic insulator body positioning portion, and the metal cap positioning portion correspond coaxially one by one; and the rack is provided with moving elements for driving the upper placement plate and the lower placement plate to rise and fall, respectively, and a vibrating element for driving the middle placement plate to vibrate.

6. The device according to claim 5, wherein the metal pin positioning portion comprises a tapering tube and two limit boxes symmetrically located at a bottom of the tapering tube; the limit box is provided therein with an upper sliding bar, a lower sliding bar, and a moving plate that are slidable horizontally; the limit box is further provided therein with a rotatable transmission wheel; the upper sliding bar is meshed with a top of the transmission wheel; an end of the upper sliding bar is provided with a mounting plate; the mounting plate is provided with clamping wheels through elastic telescopic rods; the mounting plate is further provided with a compression rod; the compression rod and the clamping wheels extend horizontally outside the box; an extension distance of the compression rod is smaller than an extension distance of the clamping wheel corresponding to an original length of the elastic telescopic rod; the lower sliding bar is meshed with a bottom of the transmission wheel; a bottom of the lower sliding bar is provided with a protruding post; a top of the moving plate is provided with a strip groove; the protruding post is movably inserted into the strip groove; an end of the moving plate is provided with a receiving rod that extends outside the box; the limit box is further provided with a telescopic cylinder for driving the horizontal movement of the upper sliding bar;

when the telescopic cylinders drive the upper sliding bars in the two limit boxes to move away from each other, the transmission wheels drive the two lower sliding bars to move towards each other; the protruding posts move inside the strip grooves and drive the two moving plates to move towards each other, such that a minimum distance between the two clamping wheels is greater than a maximum outer diameter of top and bottom expanding portions of the metal pin, and a minimum distance between the two receiving rods is smaller than a maximum outer diameter of the bottom expanding portion of the metal pin; and thus, the metal pin is placed between the two limit boxes through the tapering tube and is received by the two receiving rods; and when the telescopic cylinders drive the upper sliding bars in the two limit boxes to move towards each other, the transmission wheels drive the two lower sliding bars to move away from each other; the protruding posts move inside the strip grooves and drive the two moving plates to move away from each other, such that the minimum distance between the two clamping wheels is less than a maximum outer diameter of the top expanding portion of the metal pin and the minimum distance between the two receiving rods is greater than the maximum outer diameter of the bottom expanding portion of the metal pin; in the process, the two clamping wheels first come into rolling contact with an outer wall of the metal pin; then, the two receiving rods detach from the bottom expanding portion of the metal pin, causing the metal pin to fall until the top expanding portion of the metal pin is clamped by the clamping wheels; and finally, the elastic telescopic rods are contracted to compress the compression rods onto the outer wall of the metal pin, thereby achieving the positioning of the metal pin.

7. The device according to claim 5, wherein the ceramic insulator body positioning portion is a through-hole that matches an outer wall of a fixed skirt of the ceramic insulator body in terms of shape and size; and the metal cap positioning portion is a through-hole that matches an outer wall of the metal cap in terms of shape and size.

8. The device according to claim 5, wherein two side edges of the upper placement plate and the lower placement plate are respectively provided with nut sleeves through connecting rods; the moving elements are located at two sides of the rack and are formed by a motor and a screw that are connected; the nut sleeve is movably sleeved on the screw; two side edges of the middle placement plate are provided with elastic joints, respectively; the middle placement plate is non-rigidly connected to the rack through the elastic joints; and a bottom of the upper placement plate is provided with multiple elastic compression sleeves that correspond to the ceramic insulator body positioning portions one by one.

* * * * *